July 3, 1928.  
L. B. GREEN  
COMPRESSOR  
Filed June 27, 1925  
1,675,546  
2 Sheets-Sheet 2
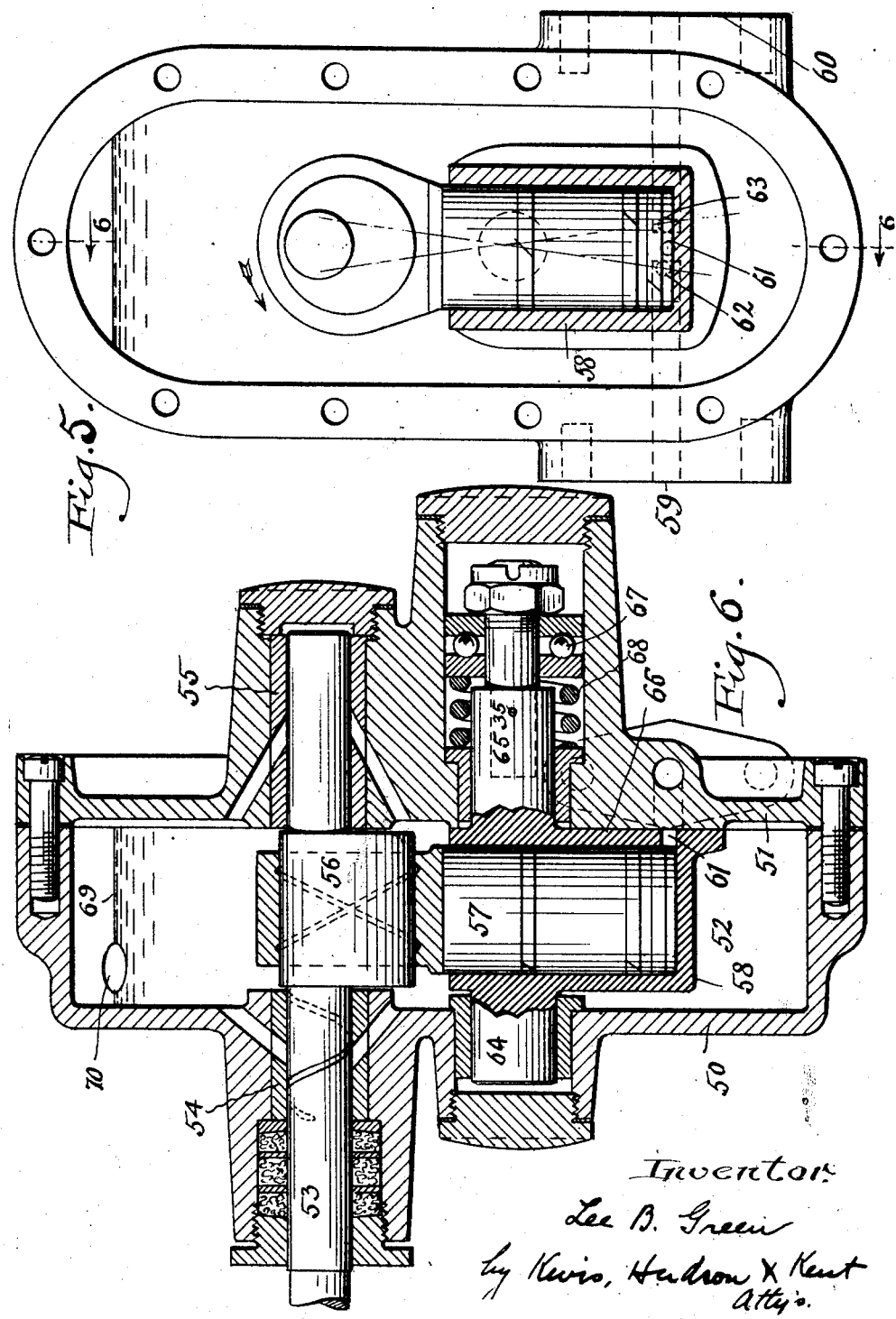

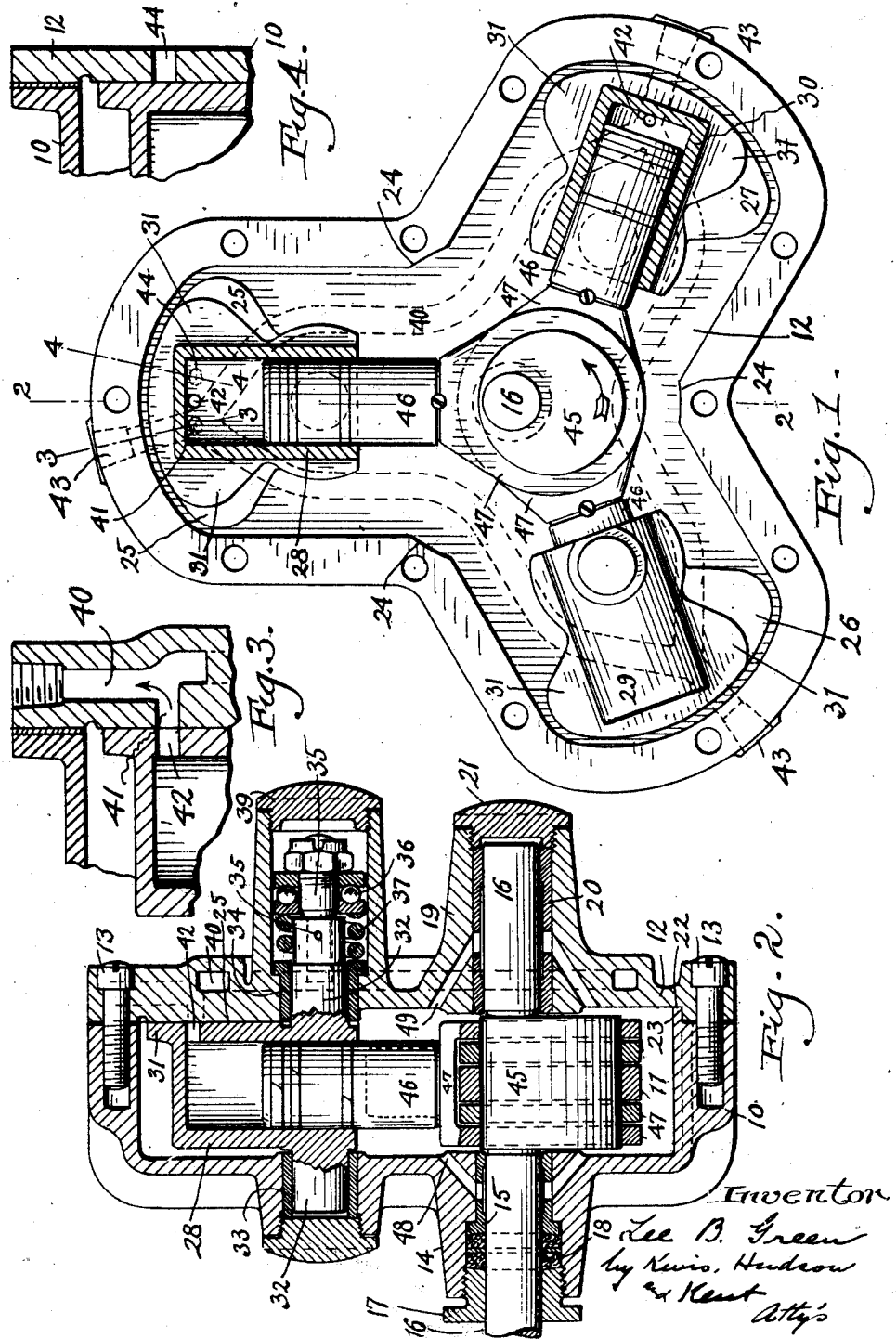

Patented July 3, 1928.

1,675,546

UNITED STATES PATENT OFFICE.

LEE B. GREEN, OF LAKEWOOD, OHIO, ASSIGNOR OF ONE-THIRD TO EARL L. JONES, OF CLEVELAND, OHIO; ONE-THIRD TO CASSIUS L. FINNEY, OF CANTON, OHIO; AND ONE-THIRD TO CONRAD B. KRAUSE, OF CLEVELAND, OHIO.

COMPRESSOR.

Application filed June 27, 1925. Serial No. 39,938.

This invention relates to compressors for air and other gases and has for one of its objects the provision of a compressor especially adapted for use in connection with air-brake systems for vehicles.

A further object of the invention is to provide a compressor of very simple design that may be manufactured at a relatively low cost and which will be equipped with an efficient lubricating system whereby the wear of the operating parts is reduced to a minimum, and the compressor adapted to be operated continuously over long periods of time without attention and loss of efficiency.

Other objects of the invention and features of novelty will be apparent from the following description taken in connection with the accompanying drawings of which:

Fig. 1 is an elevation of a compressor embodying my invention, one of the parts of the housing being removed to show the internal mechanism and certain parts being shown in section;

Fig. 2 is a section of the same on the line 2—2 of Fig. 1;

Fig. 3 is a detail section on the line 3—3 of Fig. 1;

Fig. 4 is a detail section on the line 4—4 of Fig. 1;

Fig. 5 is a view similar to Fig. 1, but illustrating a single-cylinder compressor embodying my invention; and Fig. 6 is a section of the same on the line 6—6 of Fig. 5.

Referring to the drawings, 10 indicates a part of the housing which is formed with a chamber 11. The other part of the housing consists of the member 12, substantially in the form of a plate, which closes the open side of the chamber 11, and is secured to the part 10 by a series of screws 13 arranged about the peripheries of the members 10 and 12. The part 10 of the housing is formed with a boss 14 in which there is a bearing 15 for the operating shaft 16, this shaft being extended to the exterior of the housing in order to receive a gear, or pulley, or other driving device, leakage of lubricant from the bearing 15 being prevented by a stuffing box comprising the gland 17 and the packing 18. The member 12 is likewise provided with a boss 19 in which there is a bearing 20 for the opposite end of the shaft 16, the bearings 15 and 20 being in axial alignment. The outer end of the boss 19 is closed by a cap 21. In order to properly assemble the housing parts 10 and 12, with the bearings 15 and 20 in alignment, the part 10 is provided with three lugs 22 having their outer surfaces 23 machined concentric to the axis of the shaft 16 to fit corresponding surfaces 24 on the part 12.

On the interior of the part 12 there are three bearing surfaces 25, 26 and 27 on which the cylinders 28, 29 and 30, respectively, are mounted, each of these cylinders having laterally projecting flanges 31 to increase the bearing surface of the cylinders and provide adequate sealing between the faces of the cylinders and the surfaces 25, 26 and 27. Each of the cylinders 28, 29 and 30 has a pair of trunnions 32, on opposite sides thereof, which are oscillatably mounted in the bearings 33 and 34, respectively, in the parts 10 and 11. One of the trunnions 32 has an extension 35 which is secured therein by a threaded connection and a pin 35′ and on which is mounted a ball thrust bearing 36, a spring 37 being arranged between the bearing 36 and the end of the bearing 34 to draw the cylinders against the surfaces 25, 26 and 27 so as to provide a sealing engagement. The outer ends of the trunnion bearings 33 and 34 are closed by the caps 38 and 39, respectively, in order to prevent leakage of lubricant at these points. A discharge passage 40 is formed in the part 10 and ports 41 establish communication between this passage and ports 42 in each of the cylinders when these ports are in registration. The part 12 is also provided with outlet connections 43 with which a discharge pipe may be connected for conducting the compressed air, or gas, to any desired point. Inlet ports 44 extend through the wall of the part 12 and cooperate with the ports 42 in the cylinders for supplying air, or gas, thereto.

The shaft 16 has an eccentric 45 thereon, in the chamber 11 and pistons 46, in each of the cylinders, are operatively connected with the eccentric 45 by yokes 47.

In using the compressor the chamber 11 will be substantially filled with lubricant which will practically submerge all of the operating parts and, in order to thoroughly lubricate the bearings 15 and 20, I have provided the oil passages 48 and 49 which lead from the chamber 11 to the middle of these bearings.

As the shaft 16 is rotated the eccentric 45 will cause the pistons 46 to be reciprocated in the cylinders and will also cause the latter to oscillate and successively register the ports 42 therein with the inlet and discharge ports 44 and 41 respectively. On the suction stroke of each of the pistons, the port 42 registers with the port 44 and permits air to be drawn into the cylinder, the oscillation of the cylinder then carries the port 42 out of registration with the port 44 so that, on the return stroke of the pistons, the air, or gas, in the cylinder is compressed and ultimately discharged through the port 41 when the port 42 is brought into registration with the latter.

In Figs. 5 and 6 I have illustrated the application of my invention to a single-cylinder compressor comprising the housing parts 50 and 51 between which there is a chamber 52. An operating shaft 53 is mounted in the bearings 54 and 55 and carries an eccentric 56 which operates the piston 57 in the cylinder 58. On one side of the housing part 51 there is an inlet connection 59 and on the opposite side, a discharge connection 60, and the cylinder has a port 61 adapted to register with the inlet port 62 and the discharge port 63, as the cylinder oscillates. The cylinder has aligned trunnions 64 and 65 and is held against the surface 66 by means of the thrust bearing 67 and spring 68.

The interior of the housing is filled with lubricant to substantially the level 69 and an opening 70 is provided in the housing for the purpose of supplying the lubricant thereto.

It is believed that the other details of construction and the operation of the compressor shown in Figs. 5 and 6, will be clear from the foregoing description of the three cylinder embodiment illustrated in Figs. 1 to 4.

Having described my invention, what I claim is:

In compressors, the combination of a housing comprising two sections bolted together and having a chamber and bearings in the walls on opposite sides of the chamber, said bearings being arranged in aligned pairs, an oscillatable cylinder having trunnions mounted in one of said pairs of bearings, a shoulder formed on one of the trunnion bearings, a shaft mounted in another of said pairs of bearings and extending to the exterior of said housing, said walls having ports which communicate with said chamber and through which lubricant is circulated through said shaft bearings, one of said walls having inlet and discharge ports therein and said cylinder having a port which cooperates with said inlet and discharge ports, said wall being provided with a bearing surface against which said cylinder is pressed to form a seal for said ports, one of said trunnions having an extension threaded and pinned therein, a thrust bearing carried by said extension, a spring engaging the shoulder on the trunnion bearing cooperating with said thrust bearing to hold said cylinder against said surface and to secure said trunnion bearing in place, an eccentric on said shaft, and a piston in said cylinder operatively connected with said eccentric.

In testimony whereof, I hereunto affix my signature.

LEE B. GREEN.